Feb. 21, 1950     W. M. HARRISON     2,498,368
PROCESS FOR CURING ACRYLIC BASE DENTURE MATERIAL
Filed March 22, 1946     2 Sheets-Sheet 1
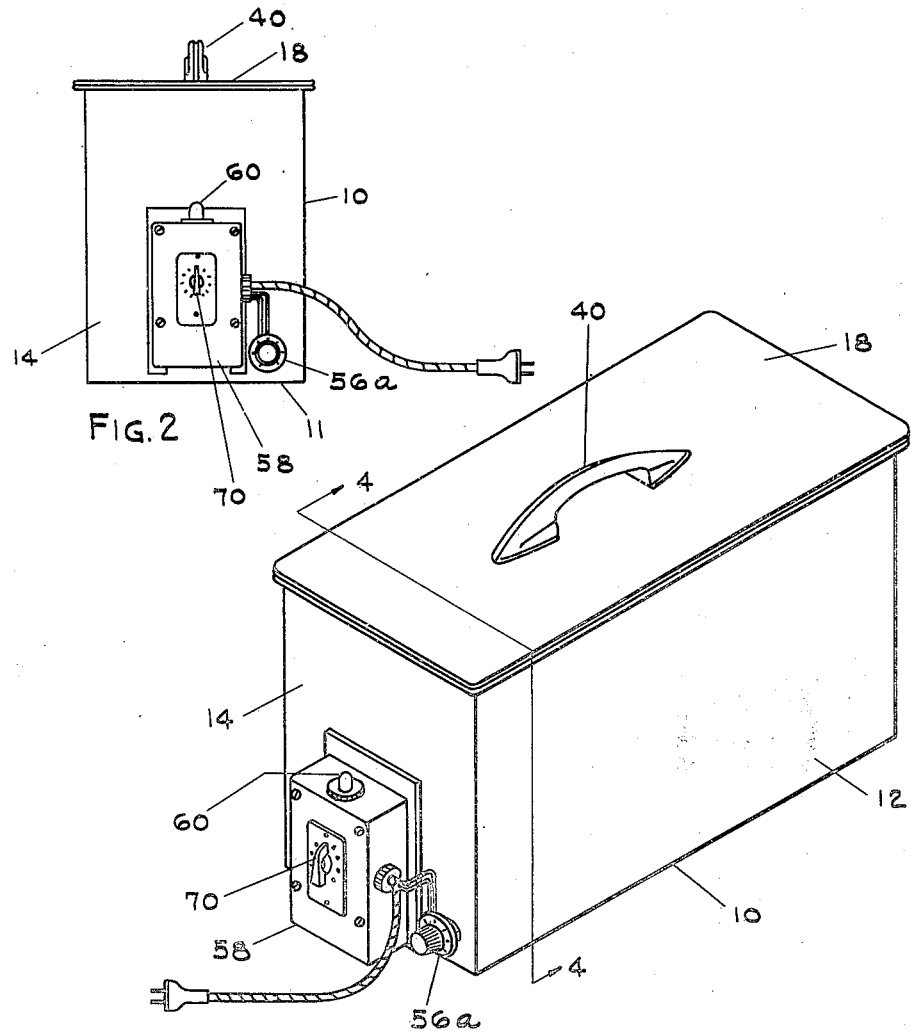
*INVENTOR.*
WILLIAM M. HARRISON
BY
*DesJardins & Compton*
HIS ATTORNEYS

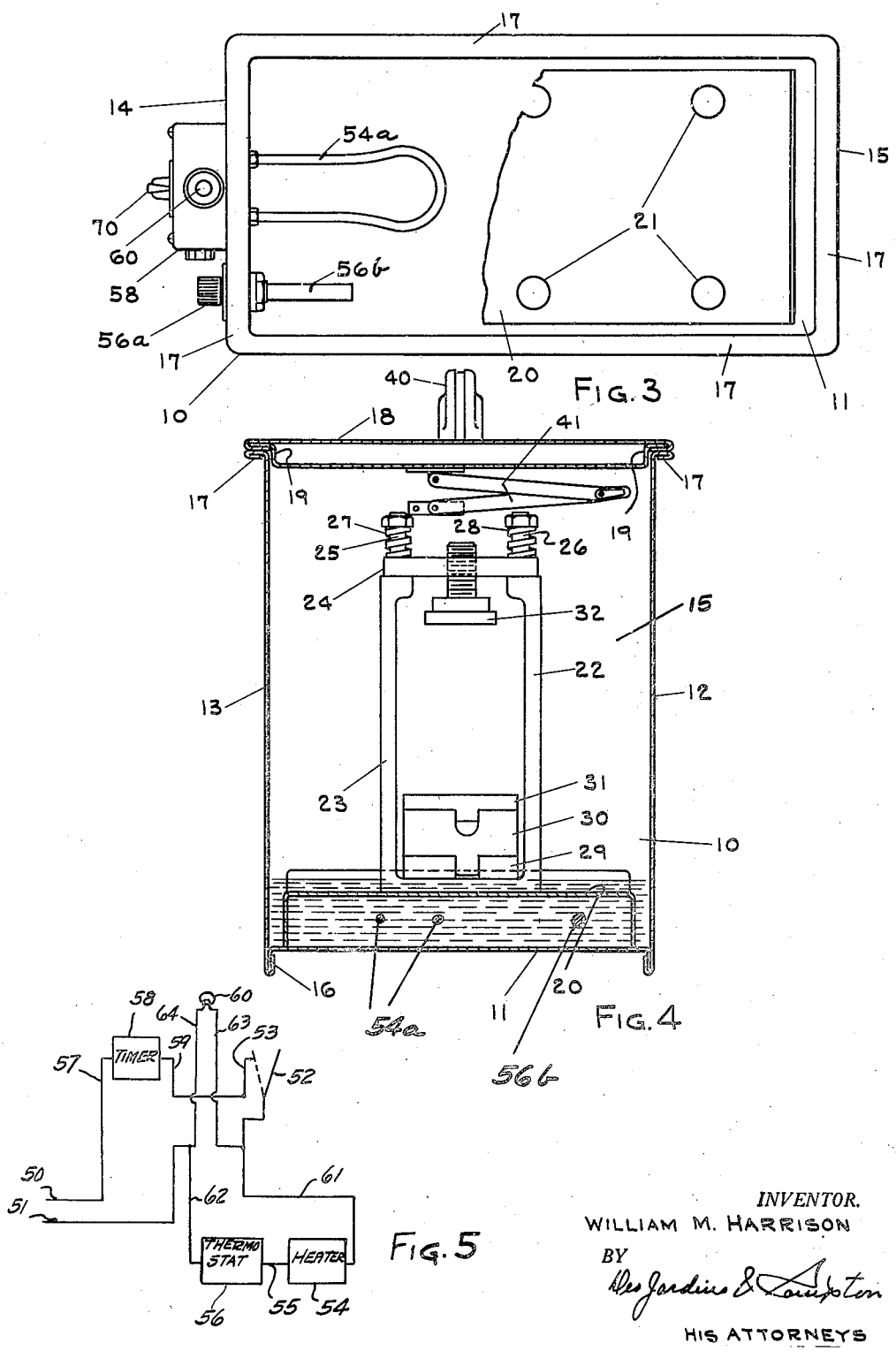

Patented Feb. 21, 1950

2,498,368

UNITED STATES PATENT OFFICE 2,498,368

PROCESS FOR CURING ACRYLIC BASE DENTURE MATERIAL

William M. Harrison, Terrace Park, Ohio, assignor to The Harrison Dental Company, Inc., Cincinnati, Ohio, a corporation of Ohio Application March 22, 1946, Serial No. 656,475

4 Claims. (Cl. 18—55.1)

My invention relates to an improved process for curing acrylic base denture material.

It is the practice to make dentures of acrylic base materials, which are cured or set by subjecting the dentures to a suitable curing temperature, depending upon the material used. It has been the uniform practice, heretofore, to cure the acrylic base denture material by submerging one or more plaster molds containing such materials, the molds having been covered internally with a layer of tin foil or other impervious material before filling with the acrylic base, in a body of water, which is then heated to the boiling point and held there until the operator deems the curing operation complete. This practice has many disadvantages, among which may be noted the difficulty of achieving an even and controlled cure, the danger of overcuring, the excessive shrinking of the denture under cure, and the danger of distortion of the mold and the denture contained therein. The principal object of my invention is to provide a process of curing acrylic base denture material that will eliminate or greatly reduce these disadvantages inherent in prior practice.

A further object of my invention is to provide a process of curing denture material such that the curing temperature may be controlled within very narrow limits, for instance, within 0.1° F., if desired.

Another object of my invention is to provide a process for curing acrylic base denture material, which results in much less shrinkage of the denture material than took place in the prior practice.

A further object of my invention is to provide a process of curing acrylic base dentures, which results in dentures that are tougher and more resilient than those cured by the old practice.

A further object of my invention is to provide a process of curing denture material that may be more easily and cheaply carried out than old methods, it being unnecessary to apply tin foil to the plaster molds prior to curing.

Another object of my invention is to provide a process of curing acrylic base denture material in which the plaster mold containing such material is never immersed in water, thus avoiding distortion of the mold during curing.

A further object of my invention is to provide a process of curing acrylic base denture material in which the heat due to the exothermic curing reaction is carried away more effectively, thus permitting the ready maintenance of the curing temperature within comparatively narrow limits.

Another object of my invention is to provide a process for curing acrylic base denture material in which particles of the plaster mold, and impurities therein, will not be incorporated in the denture material during curing, notwithstanding the omission of the tin foiling step, heretofore used.

Further objects, and objects relating to details of construction and economies of operation, will definitely appear from the detailed description to follow. In one instance, I have accomplished the objects of my invention by the devices and means set forth in the following specification. My invention is clearly defined and pointed out in the appended claims. Apparatus useful in carrying out the improved process of my invention, is illustrated in the accompanying drawings, forming a part of this specification, in which:

Fig. 1 is a view in perspective of my curing apparatus.

Fig. 2 is a view in end elevation of my curing apparatus.

Fig. 3 is a plan view of my curing apparatus, with the cover removed and part of the tray broken away.

Fig. 4 is an enlarged, vertical sectional view, taken along the line 4—4 of Fig. 1, and Fig. 5 is a wiring diagram, showing the electrical circuit connecting the timer, the thermostatic switch and the heating unit of my device.

In the drawings, the same reference numerals refer to the same parts throughout the several views, and the sectional view is taken looking in the direction of the arrows at the ends of the section line.

My improved process for curing acrylic base denture material includes the step of surrounding one or more molds containing such material with hot water vapor maintained at the curing temperature. To this end, one or more plaster molds containing the denture material are surrounded with the hot water vapor, which is maintained at the curing temperature. The mold or molds may be supported in an enclosed space above a body of water and the water is then heated to, and maintained at, a temperature sufficient to surround the molds with an atmosphere of hot water vapor at curing temperature. This atmosphere may be maintained for a predetermined period by maintaining the heating of the water for such period.

In carrying out the process of my invention, the usual plaster mold is filled with the acrylic base denture material, the mold not being lined with tin foil, as has been the prior practice. One or more molds, so filled with the denture material, are supported in an enclosed space above a body of water, and heat is slowly applied to the water to bring it to the desired operating temperature. For instance, I have found it desirable to heat the water at a rate which will bring it to a temperature of 165° F. at the end of a 55 minute period. The heating is continued under thermostatic control so that the temperature of the body of water is maintained substantially constant, for the curing period. The temperature may be maintained between 160° F. and 190° F. depending upon the curing period, and that may vary from one to eight hours. For instance, if a short cure is desired, the temperature of the water may be maintained at 185° F. for 1½ to 2 hours. If a long cure is wished, the temperature of the water may be maintained at 170° F. for 6 to 8 hours.

Referring to the numbered parts of the drawings, my improved apparatus for curing acrylic base denture material comprises a vat or container 10 having a bottom wall 11, side walls 12 and 13, and end walls 14 and 15. This container is made with a water-tight seam or joint between the bottom and the side and end walls, so that a body of water, indicated in Fig. 4, may be maintained in the water space in the lower part of the container, leaving a vapor space above the water. The bottom 11 has downwardly-extending flanges 16, over which the lower portions of side walls, 12 and 13, and end walls, 14 and 15 are crimped. The upper end of the container is closed by a cover 18, which seats on the lateral flanges 17, extending from the upper ends of the side and end walls, said cover having a downwardly-extending portion fitting it and closing the upper end of the container. The cover 18 is connected to the end wall 15 by a pair of links 41, one end of each link being pivotally connected to the other, and the other ends of said links being pivoted, respectively, to the end wall 15 and the cover 18. A handle 40 is provided on cover 18.

A tray 20 is removably seated on the bottom 11 and provided with a number of holes 21 therein, permitting the ready escape of vapor when the water in the water space is heated. The tray 20 supports a plurality of carrying and holding structures 22 (but one being shown), each comprising a U-shaped member 23, on the upper ends of the legs of which are studs 25 and 26. A cross-bar 24 is slidably mounted on said studs and resiliently held in engagement with the upper ends of said legs, by springs 27 and 28, surrounding said studs and compressed between nuts screwed on the ends thereof and the cross-bar 24. Each of these structures 22 supports a plurality of molds, containing the acrylic base denture material, in the vapor space above the body of water in the bottom of container 10. I have shown, in Fig. 4, a structure adapted to hold and support three molds, each mold being enclosed in the usual flask comprising the parts 29, 30 and 31. The flasks will be positioned one on the other, between the legs of member 23, with the part 31 of the uppermost flask engagin the head of screw 32, which is adjustable in cross-bar 24.

An electric heater 54 is mounted on the container 10, with its heating element 54a extending into the body of water in the water space of said container. The circuit to said heater is controlled by a thermostatic switch 56, the control element 56b of which extends into the water in the water space of the container. This thermostatic switch may be of any of the well-known types, arranged to break the circuit to the heater when the temperature of the water exceeds a certain value, and such thermostatic switch is preferably adjustable, by knob 56a, to vary the temperature at which the water will be maintained. A timer, or time-controlled switch, 58, is also mounted on the container 10, and provided with a setting handle 70, the arrangement being such that, when the handle 70 is set manually to a position corresponding to a certain period of time, the circuit to the heater will be broken upon the lapse of that period from the setting.

The electrical circuit for the heater is shown in Fig. 5. Lines 50 and 51 are to be connected to a source of current, preferably, 110 volt A. C. Line 51 is connected by lead 62 to one terminal of the thermostatic switch 56, the other terminal of which is connected to one terminal of the electric heater 54. The other terminal of the heater is connected by lead 61 to the movable contact 52 of a manual switch, the fixed contact 53 of which is connected by lead 54 to one terminal of the timer 58, the other terminal of which is connected by lead 57 to line 50. Thus, the time-controlled switch 58, the manual switch 52, the electric heater 54 and the thermostatic switch 56 are connected, in series, in the circuit. A signal lamp 60 is connected, by leads 63 and 64, to leads 61 and 62, respectively, in parallel to the thermostatic switch 56 and heater 54. This lamp will be lit when the circuit is closed by switches 52 and 58, to indicate that the apparatus is operating.

The acrylic base denture material having been placed in the molds, and the molds, in flasks, 29, 30, 31, having been clamped in place in structures 22, these molds are supported in the vapor space above the body of water and in the water space in the bottom of container 10. The loaded structures 22 having been positioned on tray 20, the cover 18 is put in place to close the vapor space. Manual switch 52 is closed and knob 56a of the thermostatic switch is adjusted to the temperature at which the cure is to take place. Setting handle 70 of the time-controlled switch is now adjusted to the desired time or curing period. This causes the electric current to flow through heater element 54a, which gradually heats the body of water in the water space, causing the vapor space to fill with hot vapor. When handle 70 was adjusted, the lamp 60 was lit and it remains lighted until the circuit is broken by manual switch 52 or timer switch 58. If the temperature of the body of water exceeds the value at which thermostatic switch 56 is adjusted, the heater circuit will be interrupted automatically and reestablished automatically when the water temperature falls below that value. Thus, the water temperature, and the vapor temperature, are maintained automatically at the curing value, after the operating temperature has been attained, and the heating is stopped automatically at the end of the desired curing period.

I am aware that the process and apparatus herein disclosed are susceptible of considerable variation, without departing from the spirit of my invention, and, therefore, I claim my invention broadly, as indicated by the appended claims.

Having thus described my invention, what I claim as new and useful, and desire to secure by Letters Patent, is:

1. A process for curing heat hardenable acrylic base denture material including the step of surrounding a plaster mold containing said material with hot water vapor maintained at the curing temperature.

2. A process for curing heat hardenable acrylic base denture material including the steps of supporting a vapor permeable plaster mold containing said material in an enclosed space above a body of water within the space; and heating said water to, and maintaining it at at, a temperature sufficient to surround said mold with hot water vapor at curing temperature.

3. A process for curing heat hardenable acrylic base denture material including the steps of supporting a vapor permeable plaster mold containing said material in an enclosed space above a body of water within the space; heating said water to fill said space with hot vapor at curing temperature; and maintaining said water at a predetermined temperature for a predetermined time to maintain said hot vapor at curing temperature.

4. A process of curing heat hardenable acrylic base denture material including the steps of supporting a vapor permeable plaster mold containing said material in an enclosed space above a body of water within the space; and maintaining said body of water at a temperature of from about 160° F. to 190° F. for a period of from one to eight hours.

WILLIAM M. HARRISON.

REFERENCES CITED

The following references are of record in the file of this patent:

UNITED STATES PATENTS

| Number | Name | Date |
|---|---|---|
| Re. 7,272 | McDermut | Aug. 22, 1876 |
| 1,585,348 | Hick et al. | May 18, 1926 |
| 2,225,857 | Chenoweth | Dec. 24, 1940 |
| 2,234,993 | Vernon et al. | Mar. 18, 1941 |
| 2,385,143 | Levine | Sept. 18, 1945 |
| 2,395,241 | Allen | Feb. 19, 1946 |

FOREIGN PATENTS

| Number | Country | Date |
|---|---|---|
| 484,343 | Great Britain | May 4, 1938 |